(12) United States Patent
Chen et al.

(10) Patent No.: US 12,435,871 B2
(45) Date of Patent: Oct. 7, 2025

(54) IMAGE DISPLAY DEVICE WITH AN AMBIENT LIGHT STRIP ASSEMBLY AND LIGHT STRIP ASSEMBLY

(71) Applicant: FOSHAN NATIONSTAR OPTOELECTRONICS CO., LTD., Foshan (CN)

(72) Inventors: Zihao Chen, Foshan (CN); Danlei Gong, Foshan (CN); Jian Gan, Foshan (CN); Kun Xu, Foshan (CN); Weineng Chen, Foshan (CN); Xiang Chen, Foshan (CN); Zhonghai Yan, Foshan (CN); Fabo Liu, Foshan (CN)

(73) Assignee: FOSHAN NATIONSTAR OPTOELECTRONICS CO., LTD., Foshan (CN)

( * ) Notice: Subject to any disclaimer, the term of this patent is extended or adjusted under 35 U.S.C. 154(b) by 0 days.

(21) Appl. No.: 18/939,643

(22) Filed: Nov. 7, 2024

(65) Prior Publication Data
US 2025/0216066 A1    Jul. 3, 2025

(30) Foreign Application Priority Data
Dec. 29, 2023    (CN) .......................... 202311862334.5

(51) Int. Cl.
*F21V 33/00*    (2006.01)
*F21S 4/28*    (2016.01)
*F21Y 113/00*    (2016.01)

(52) U.S. Cl.
CPC ............ *F21V 33/0052* (2013.01); *F21S 4/28* (2016.01); *F21Y 2113/00* (2013.01)

(58) Field of Classification Search
CPC ...... F21V 33/0052; F21S 4/28; F21Y 2113/00
See application file for complete search history.

(56) References Cited

U.S. PATENT DOCUMENTS

2010/0277666 A1\* 11/2010 Bertram .................... F21K 9/00
362/249.02
2011/0273905 A1\* 11/2011 Lin ...................... G02B 6/0068
362/607
(Continued)

FOREIGN PATENT DOCUMENTS

CN        214501125 U  \* 10/2021

OTHER PUBLICATIONS

English translation of Luo CN-214501125-U (Year: 2021).\*

*Primary Examiner* — Evan P Dzierzynski
(74) *Attorney, Agent, or Firm* — CM Law; Stephen J. Weed (57) ABSTRACT

An image display device with an ambient light strip assembly includes a back plate and a light strip assembly. The light strip assembly includes a first light group disposed horizontally, a second light group disposed vertically, a first corner light group, and a second corner light group. The first corner light group and the second corner light group are located between the first light group and the second light group. The first corner light group includes more than two auxiliary light beads. One auxiliary light bead is adjacent to the second corner light group, the remaining auxiliary light beads are arranged in sequence toward the first edge, the vertical distance between the auxiliary light bead adjacent to the second corner light group and the first edge is greater than the vertical distance between the auxiliary light bead on the other side and the first edge.

10 Claims, 5 Drawing Sheets

(56) References Cited

U.S. PATENT DOCUMENTS

| | | | |
|---|---|---|---|
| 2019/0302352 A1* | 10/2019 | Xu ....................... | G02B 6/0005 |
| 2020/0271305 A1* | 8/2020 | Kay ......................... | F21K 9/20 |
| 2023/0375147 A1* | 11/2023 | Zhang .................... | F21S 2/005 |

* cited by examiner

IMAGE DISPLAY DEVICE WITH AN AMBIENT LIGHT STRIP ASSEMBLY AND LIGHT STRIP ASSEMBLY

CROSS-REFERENCE TO RELATED APPLICATIONS

This application claims priority to Chinese Patent Application No. 202311862334.5, filed on Dec. 29, 2023, the disclosure of which is incorporated herein by reference in its entirety.

TECHNICAL FIELD

The present disclosure relates to the field of lighting technology and, in particular, to an image display device with an ambient light strip assembly and a light strip assembly.

BACKGROUND

In daily life, people often watch televisions, monitors, and other image display devices in a dark environment to simulate the effect of a movie theater. However, compared with the large-area light emission of a huge silver screen, the strong light emitted by the image display device easily forms a sharp contrast with the dim surrounding environment, causing visual fatigue and affecting your vision. Moreover, it is difficult to enhance an atmosphere by relying solely on the light emitted by the image display device, resulting in a poor visual effect of the overall picture. Therefore, in the related art, light strips are mounted on the back of the image display device or a background wall opposite to the image display device and serve as ambient lights. The colors and brightness of these ambient lights change with the color and brightness of the light emitted by the image display device so that while the strong contrast with the ambient brightness is reduced, the atmosphere can be better enhanced according to the playback content, thereby improving the visual effect.

However, corners of the image display device commonly have dark regions due to insufficient or uneven brightness, thereby affecting the overall visual effect.

SUMMARY

The present disclosure provides an image display device with an ambient light strip assembly.

The present disclosure adopts the technical solutions below.

An image display device with an ambient light strip assembly includes a light strip assembly and a back plate. The light strip assembly is mounted on the back plate and emits light to the outer side of the image display device; the light strip assembly includes a first light group, a second light group, a first corner light group, and a second corner light group; along a direction perpendicular to a plate surface of the back plate, a projection of the first light group is adjacent to and arranged along a first edge of the back plate, a projection of the second light group is adjacent to and arranged along a second edge of the back plate, and the first edge intersects with the second edge; the first corner light group and the second corner light group are located between the first light group and the second light group and are symmetrical about a straight line passing through the point of intersection of the first edge and the second edge; and the first corner light group includes more than two auxiliary light beads, an auxiliary light bead of the more than two auxiliary light beads is adjacent to the second corner light group, the remaining auxiliary light beads of the more than two auxiliary light beads are arranged in sequence toward the first edge, the vertical distance between the auxiliary light bead adjacent to the second corner light group and the first edge is greater than the vertical distance between an auxiliary light bead of the more than two auxiliary light beads facing away from the second corner light group and the first edge, and the angle of inclination of the light emitted by the auxiliary light bead adjacent to the second corner light group relative to the plate surface of the back plate is greater than the angle of inclination of the light emitted by the auxiliary light bead facing away from the second corner light group relative to the plate surface of the back plate.

In some embodiments, the first corner light group and the second corner light group are symmetrical about an angle bisector passing through the point of intersection of the first edge and the second edge and bisecting the included angle between the first edge and the second edge, thereby improving the uniformity of the light rays of the ambient light.

In some embodiments, four auxiliary light beads are provided. A reasonable number of auxiliary light beads can achieve a better auxiliary light effect and save costs.

In some embodiments, in the first corner light group, starting from a side adjacent to the second corner light group, the angles of inclination of the light emitted by the auxiliary light beads relative to the plate surface of the back plate are 70°, 55°, 40°, and 30°, respectively, or are 60°, 50°, 35°, and 20°, respectively, thereby reasonably controlling the illumination range.

In some embodiments, the distance between two adjacent auxiliary light beads is 3 mm to 10 mm so that the mixed light crosstalk is less.

In some embodiments, the auxiliary light beads are arranged along a straight line, where the included angle between the straight line and the first edge is 15° to 45°, thereby ensuring the auxiliary light effect.

In some embodiments, the first edge is perpendicular to the second edge, thereby being applicable to the existing image display device.

In some embodiments, the first corner light group further includes a lens housing provided with lenses corresponding to the auxiliary light beads so that the light of the auxiliary light beads is diffused and thus forms a desired light spot shape.

In some embodiments, the first corner light group further includes a substrate electrically connected to the auxiliary light beads, the lens housing is provided with a lens housing pin inserted into the substrate, and the length of the lens housing pin is greater than or equal to the thickness of the substrate, thereby stabilizing the installation of the lens housing relative to the auxiliary light beads and preventing the lens housing from falling off.

In addition, the present disclosure further provides a light strip assembly. The technical solution is described below.

A light strip assembly includes a mounting plate, a first light group, a second light group, a first corner light group, and a second corner light group. The mounting plate is provided with a first edge and a second edge intersecting with each other; along a direction perpendicular to a plate surface of the mounting plate, a projection of the first light group is adjacent to and arranged along the first edge, and a projection of the second light group is adjacent to and arranged along the second edge; the first corner light group and the second corner light group are located between the first light group and the second light group and are symmetrical about a straight line passing through the point of intersection of the first edge and the second edge; and the first corner light group includes more than two auxiliary light beads, an auxiliary light bead of the more than two auxiliary light beads is adjacent to the second corner light group, the remaining auxiliary light beads of the more than two auxiliary light beads are arranged in sequence toward the first edge, the vertical distance between the auxiliary light bead adjacent to the second corner light group and the first edge is greater than the vertical distance between an auxiliary light bead of the more than two auxiliary light beads facing away from the second corner light group and the first edge, and the angle of inclination of the light emitted by the auxiliary light bead adjacent to the second corner light group relative to the plate surface of the mounting plate is greater than the angle of inclination of the light emitted by the auxiliary light bead facing away from the second corner light group relative to the plate surface of the mounting plate.

DETAILED DESCRIPTION

For better understanding and implementation, the present disclosure is described in detail below in conjunction with drawings.

Figure 1:
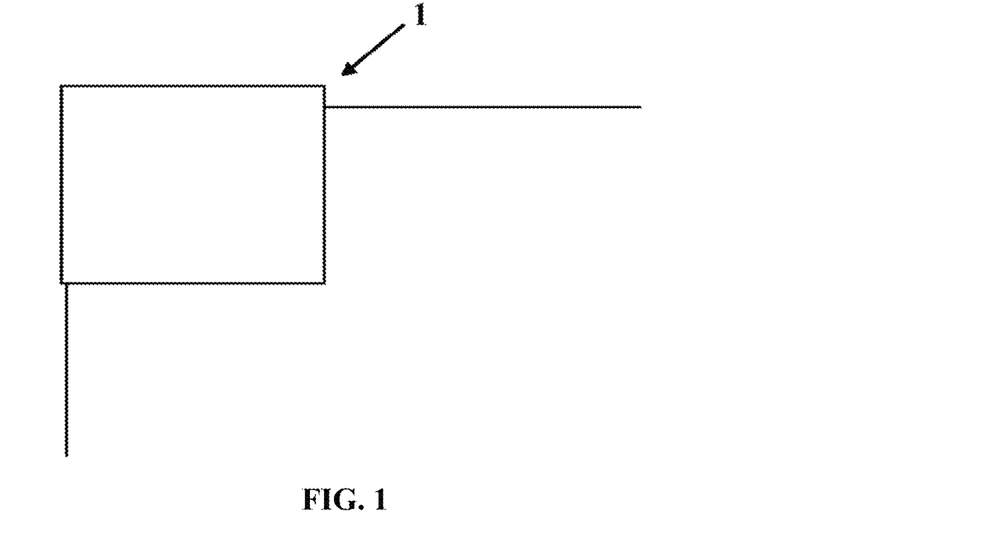
FIG. 1 is a schematic diagram of the position of a dark region when an image display device in the related art uses an ambient light.

Referring to FIG. 1, light strips are configured to be parallel or perpendicular to each other and thus easily block each other at the corners of the image display device, resulting in dark regions 1 due to insufficient or uneven brightness at the corners and affecting the overall visual effect.

Figure 2:
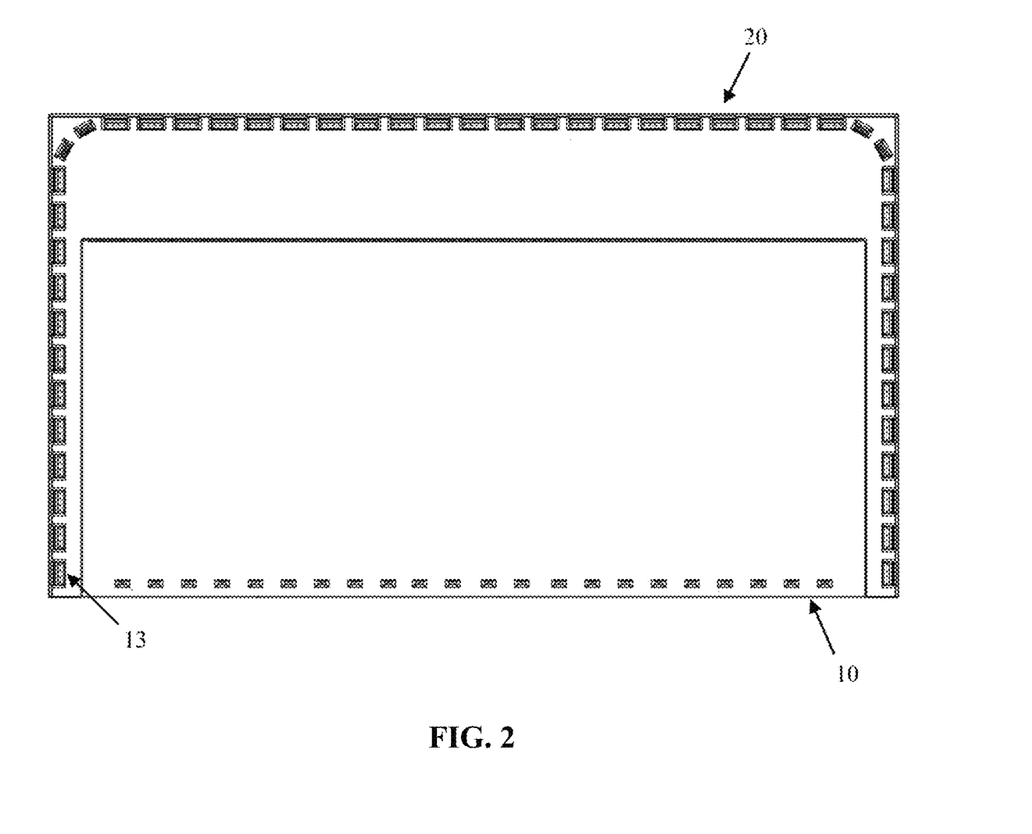
FIG. 2 is a rear view of an image display device with an ambient light strip assembly according to the present disclosure.

Referring to FIG. 2, an image display device with an ambient light strip assembly disclosed in the present disclosure includes a light strip assembly 20 to reduce dark regions that appear when an ambient light is in use. The image display device is provided with a back plate 10 opposite to the screen. The back plate 10 serves as a mounting plate, and the light strip assembly 20 is mounted on the back plate 10 and emits light to the outer side of the image display device.

Compared with the related art, the image display device with an ambient light strip assembly of the present disclosure uses multiple auxiliary light beads with different angles of inclination of the emitted light to auxiliary light at the corners of the image display device, thereby reducing the dark regions generated when the ambient light is in use, improving the overall visual effect of the ambient light, and providing uniform light to the environment in which the image display device is located to protect your vision.

In this embodiment, the back plate 10 includes one or more first edges 11, one or more second edges 12, and multiple through holes 13 formed on a plate surface. Along a direction perpendicular to the plate surface of the back plate 10, a projection of a first edge 11 and a projection of a second edge 12 intersect at a point of intersection A and form a first included angle α. In this embodiment, along the direction perpendicular to the plate surface of the back plate 10, a projection of the back plate 10 is rectangular, and the first edge 11 and the second edge 12 are the long side and the short side of the back plate 10, respectively. Preferably, the first edge A extends along a horizontal direction, the second edge B extends along a vertical direction, and the first included angle α is 90°. The light strip assembly 20 is embedded into the through holes 13 from the inner side of the image display device and faces outward so that the light strip assembly 20 is fixed to the back plate 10.

Figure 3:
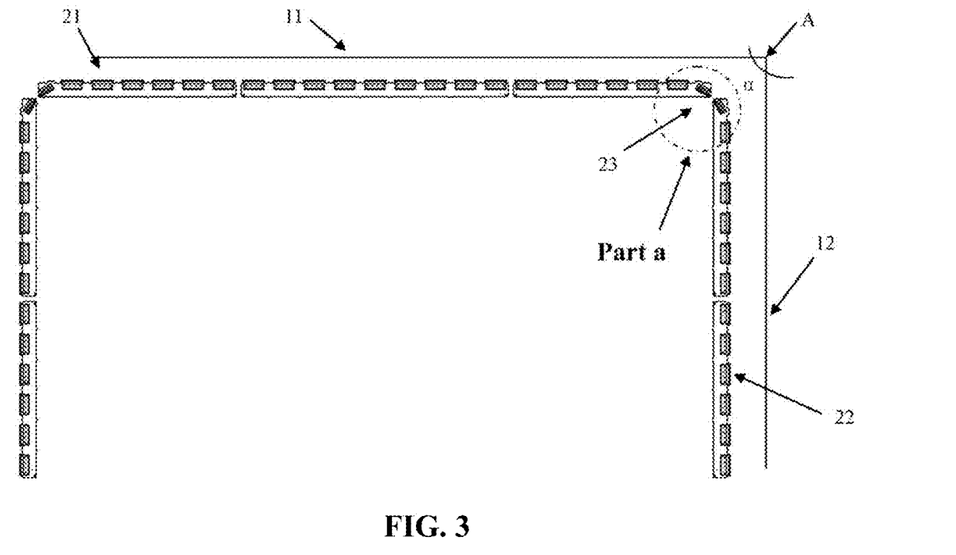
FIG. 3 is a structural view of a light strip assembly after a back plate in FIG. 2 is removed.
Figure 4:
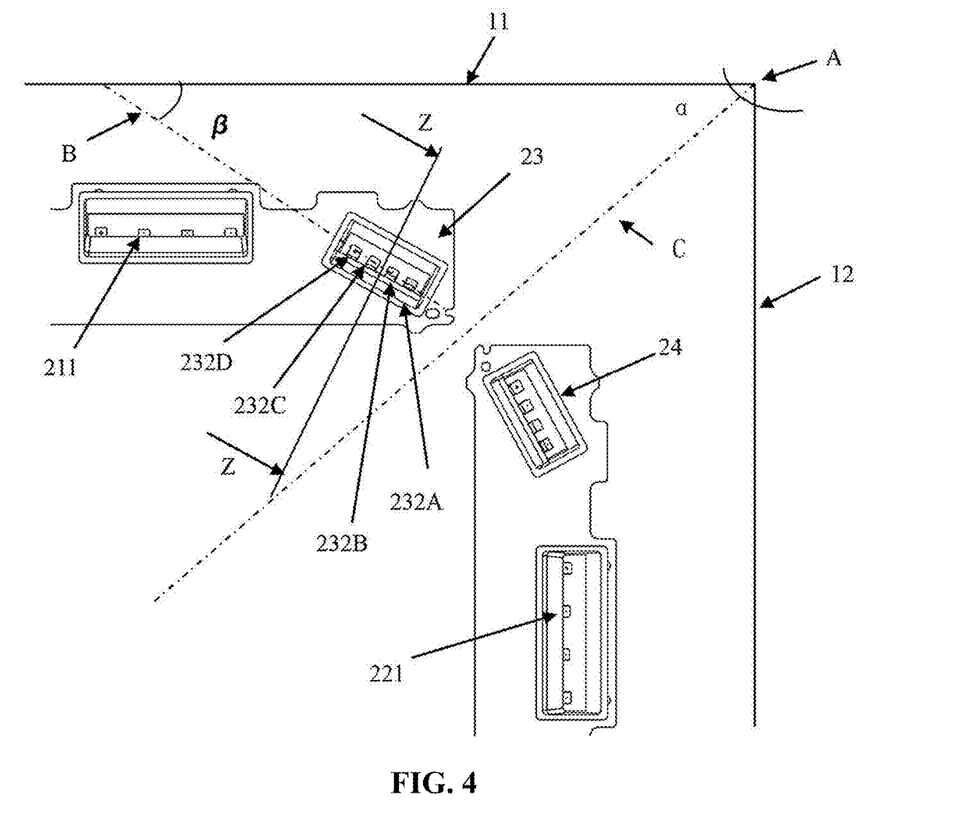
FIG. 4 is a partial enlarged view of part a in FIG. 3.
Figure 5:
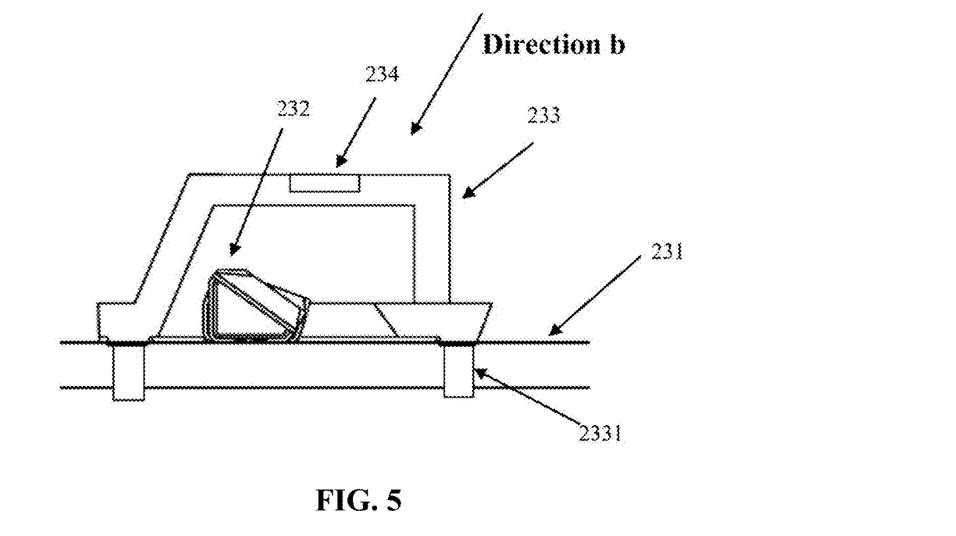
FIG. 5 is a partial enlarged sectional view taken along line Z-Z in FIG. 4.
Figure 6A:
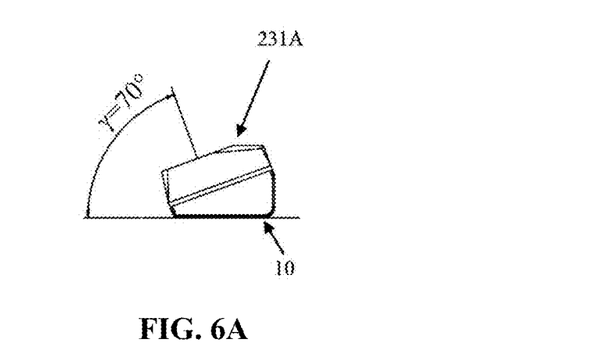
FIG. 6A is a side view of a first auxiliary light bead in the present disclosure.
Figure 6B:
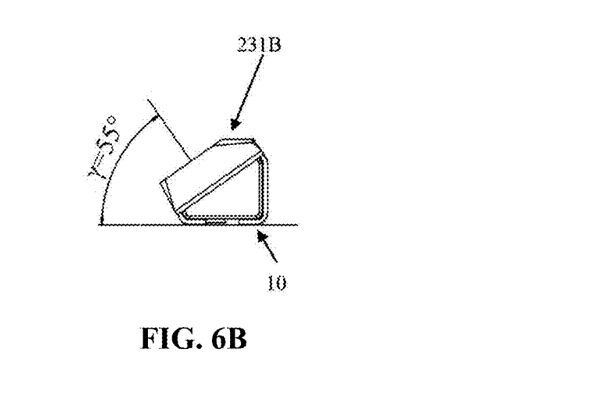
FIG. 6B is a side view of a second auxiliary light bead in the present disclosure.
Figure 6C:
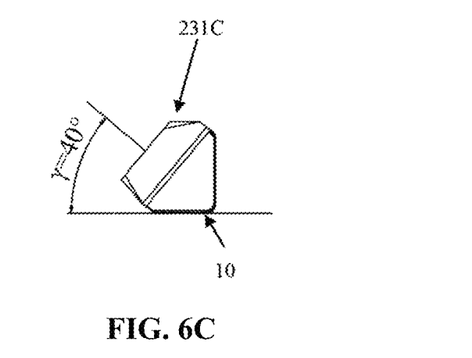
FIG. 6C is a side view of a third auxiliary light bead in the present disclosure.
Figure 6D:
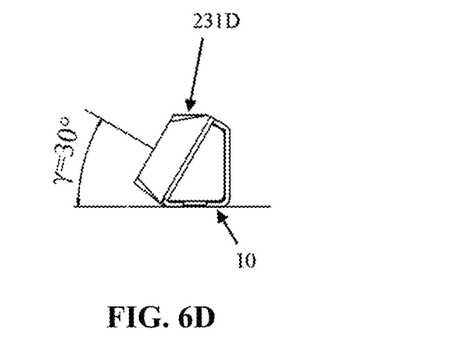
FIG. 6D is a side view of a fourth auxiliary light bead in the present disclosure.

Referring to FIGS. 3 to 5, the light strip assembly 20 includes a first light group 21, a second light group 22, a first corner light group 23, and a second corner light group 24. Along the direction perpendicular to the plate surface of the back plate 10, a projection of the first light group 21 and a projection of the second light group 22 are adjacent to the first edge 11 and the second edge 12, respectively, and the light rays from the first light group 21 and the light rays from the second light group 22 are emitted toward the first edge 11 and the second edge 12, respectively. The first light group 21 includes multiple light beads 211 arranged in sequence parallel to the first edge 11 and toward the second edge 12. The second light group 22 includes multiple light beads 221 arranged in sequence parallel to the second edge 12 and toward the first edge 11. In this embodiment, one first light group 21 is provided and extends along an edge just above the back plate 10; and two second light groups 22 are provided and located on the left and right sides of the first light group 21, respectively. Particularly, it is to be pointed out that the arrangement along the first edge 11 and the second edge 12 in the present disclosure refers to the overall arrangement direction of the light beads of the first light group 21 and the second light group 22, but it is not necessary that the light beads must be arranged in the same straight line and in a single row. As required, the light beads 211 or light beads 221 may be arranged along the first edge 11 or the second edge 12 in a wavy line, a curve, or the like, or in multiple rows or staggered front and back, or in a combination of multiple rows of curves or the like.

The first corner light group 23 and the second corner light group 24 are located between the first light group 21 and the second light group 22 and are adjacent to the point of intersection A. The first corner light group 23 and the second corner light group 24 are symmetrical about a straight line passing through the point of intersection A, where one side of the first corner light group 23 is adjacent to a side of the second corner light group 24, the other side of the first corner light group 23 is adjacent to the first edge 11, the other side of the second corner light group 24 is adjacent to the second edge 12, and the first corner light group 23 and the second corner light group 24 emit light toward the point of intersection A. In this embodiment, the first corner light group 23 and the second corner light group 24 are symmetrical about an angle bisector C of the first included angle α passing through the point of intersection A.

The first corner light group 23 includes a substrate 231, more than two auxiliary light beads 232, and a lens housing 233. The auxiliary light beads 232 are arranged along line B, inserted on the substrate 231, and electrically connected to the substrate 231. The vertical distance between the auxiliary light bead 232 adjacent to the second corner light group 24 and the first edge 11 is greater than the vertical distance between the auxiliary light bead 232 facing away from the second corner light group 24 and the first edge 11 so that a second included angle β between line B and the first edge 11 is less than 90°. In this embodiment, the second included angle β is between 15° and 45°. Preferably, the second included angle β is 30°. The lens housing 233 covers the auxiliary light beads 232 to diffuse light. The angles of inclination γ of the light emitted by the auxiliary light beads 232 relative to the plate surface of the back plate 10 are different, the angle of inclination γ of the light emitted by the auxiliary light bead 232A close to the second corner light group 24 relative to the plate surface of the back plate 10 is the maximum, the angles of inclination γ of the light emitted by the remaining auxiliary light beads 232 relative to the plate surface of the back plate 10 decrease in sequence, and the angle of inclination γ of the light emitted by the auxiliary light bead 232D close to the first edge 11 relative to the plate surface of the back plate 10 is the minimum. The second corner light group 24 has the same structure as the first corner light group 23 and includes a substrate, more than two auxiliary light beads, and a lens housing. The auxiliary light beads of the second corner light group 24 are arranged from a side adjacent to the first corner light group 23 to the second edge 12, and the substrate, auxiliary light beads, and lens housing of the second corner light group 24 and the substrate, auxiliary light beads, and lens housing of the first corner light group 23 are symmetrical about the angle bisector C. The structure of the second corner light group 24 is not repeated here.

Figure 7:
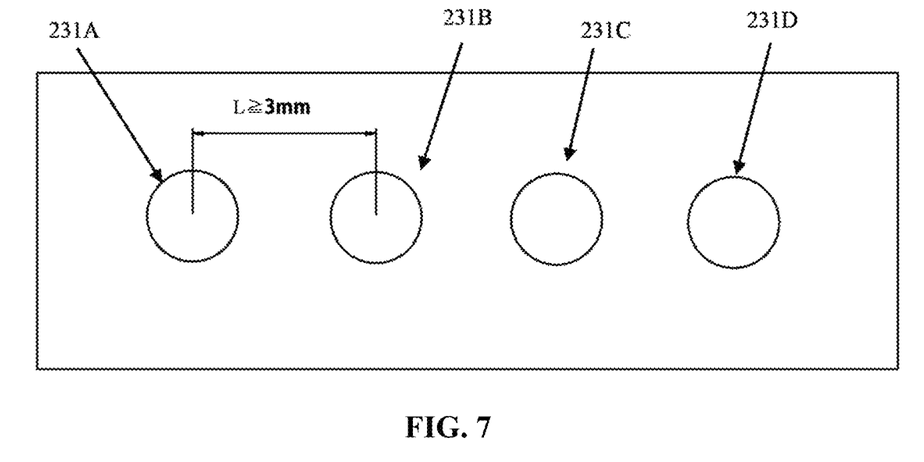
FIG. 7 is a simplified schematic diagram of the spacing between auxiliary light beads projected along direction b in FIG. 5.

In the present disclosure, the emission angles of different auxiliary light beads are set according to the distances from the outer edge of the back plate 10, and light is filled from different angles at corners where dark regions are prone to appear, thereby solving the problem of dark regions at corners; the light rays emitted by the auxiliary light beads 232 of the first corner light group 23 and the second corner light group 24 change in a certain sequence, and each auxiliary light bead controls the color of a region to achieve a layered display effect. In this embodiment, referring to FIGS. 6A to 6D, four auxiliary light beads 232 are provided, starting from a side adjacent to the second corner light group 24, the auxiliary light beads 232 are the first auxiliary light bead 232A, the second auxiliary light bead 232B, the third auxiliary light bead 232C, and the fourth auxiliary light bead 232D, respectively, and the angles of inclination γ of the light emitted by the auxiliary light beads 232A, 232B, 232C and 232D relative to the plate surface of the back plate 10 are 70°, 55°, 40°, and 30°, respectively, or are 60°, 50°, 35°, and 20°, respectively. After testing, this setting has the best light range and is economical and reasonable. Correspondingly, since the first corner light group 23 and the second corner light group 24 are symmetrical, in the second corner light group 24, starting from a side adjacent to the first corner light group 23, the angles of inclination γ of the light emitted by the auxiliary light beads relative to the plate surface of the back plate 10 are also 70°, 55°, 40°, and 30°, respectively, or are 60°, 50°, 35°, and 20°, respectively. Referring to FIG. 7, the distance L between the centers of two adjacent auxiliary light beads 232 is greater than 3 mm. Preferably, the distance between two adjacent auxiliary light beads 232 is 3 mm to 10 mm to reduce the crosstalk between the auxiliary light beads. In addition, in this embodiment, the substrate 231 is an integrated structure with the substrate of the first light group 21 and/or the substrate of the second light group 22. Further, as required, the substrates of the first light group 21, the second light group 22, the first corner light group 23, and the second corner light group 24 may be provided as independent structures. The light beads of the first light group 21, the second light group 22, the first corner light group 23, and the second corner light group 24 may be light-emitting diode (LED) light beads, which are energy-saving and environmentally friendly.

The lens housing 233 is provided with lenses 234 in one-to-one correspondence with the auxiliary light beads 232. In this embodiment, the lens housing 233 of multiple auxiliary light beads 232 is an integrated structure and is provided with multiple lenses 234 located above the auxiliary light beads 232, respectively and diffusing the light rays emitted by the auxiliary light beads 232, respectively. The lens housing 233 is an integrated structure so that the installation efficiency can be improved, but a respective lens housing 233 may be provided for each auxiliary light bead 232 as required. Preferably, the light structure in the related art is used to reduce the crosstalk of the light emitted by the auxiliary light beads 232 and form a square light spot. The lens housing 233 is provided with a lens housing pin 2331 for being inserted into the substrate 231, and the length of the lens housing pin 2331 is greater than or equal to the thickness of the substrate 231 to increase the contact area between the lens housing pin 2331 and the substrate 231, thereby preventing the lens housing pin 2331 from falling off the substrate 231.

In addition, the light strip assembly 20 may be mounted separately on a mounting plate similar to the back plate 10 and then mounted on a background wall or at other positions opposite to the image display device to form an ambient light independent of the image display device, thereby reducing maintenance costs and difficulty.

Figure 8A:
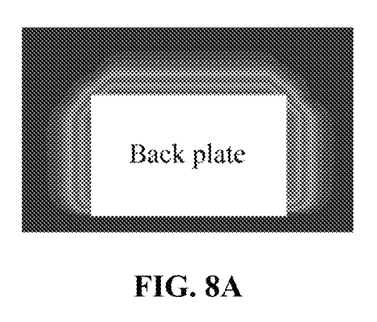
FIG. 8A shows a brightness test effect obtained when an ambient light in the related art is in use.
Figure 8B:
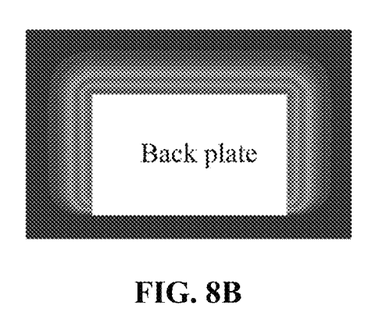
FIG. 8B shows a brightness test effect obtained when a light strip assembly in the present disclosure is in use.

It can be seen from the test results in FIGS. 8A and 8B that, compared with the related art, after the display device with the ambient light strip assembly and the light strip assembly of the present disclosure are used, the dark regions at corners are greatly reduced, the obtained illumination is uniform, the brightness is enhanced, and the mixed light crosstalk is less. Moreover, the auxiliary light beads are reasonably arranged, low in cost, easy to mount, and stable.

The preceding embodiments are merely several embodiments of the present disclosure, and the specific and detailed description thereof cannot be understood as a limit to the scope of the present disclosure. It is to be noted that for those of ordinary skill in the art, several modifications and improvements can be made without departing from the concept of the present disclosure, and these modifications and improvements are within the scope of the present disclosure.

What is claimed is:

1. An image display device with an ambient light strip assembly, comprising a light strip assembly and a back plate, wherein
the light strip assembly is mounted on the back plate and emits light to an outer side of the image display device;

the light strip assembly comprises a first light group, a second light group, a first corner light group, and a second corner light group;

along a direction perpendicular to a plate surface of the back plate, a projection of the first light group is adjacent to and arranged along a first edge of the back plate, a projection of the second light group is adjacent to and arranged along a second edge of the back plate, and the first edge intersects with the second edge;

the first corner light group and the second corner light group are located between the first light group and the second light group and are symmetrical about a straight line passing through a point of intersection of the first edge and the second edge; and the first corner light group comprises more than two auxiliary light beads, an auxiliary light bead of the more than two auxiliary light beads is adjacent to the second corner light group, remaining auxiliary light beads of the more than two auxiliary light beads are arranged in sequence toward the first edge, a vertical distance between the auxiliary light bead adjacent to the second corner light group and the first edge is greater than a vertical distance between an auxiliary light bead of the more than two auxiliary light beads facing away from the second corner light group and the first edge, and an angle of inclination of light emitted by the auxiliary light bead adjacent to the second corner light group relative to the plate surface of the back plate is greater than an angle of inclination of light emitted by the auxiliary light bead facing away from the second corner light group relative to the plate surface of the back plate.

2. The image display device with an ambient light strip assembly of claim 1, wherein the first corner light group and the second corner light group are symmetrical about an angle bisector passing through the point of intersection of the first edge and the second edge and bisecting an included angle between the first edge and the second edge.

3. The image display device with an ambient light strip assembly of claim 1, wherein four auxiliary light beads are provided.

4. The image display device with an ambient light strip assembly of claim 3, wherein in the first corner light group, starting from a side adjacent to the second corner light group, angles of inclination of light emitted by the four auxiliary light beads relative to the plate surface of the back plate are 70°, 55°, 40°, and 30°, respectively, or are 60°, 50°, 35°, and 20°, respectively.

5. The image display device with an ambient light strip assembly of claim 3, wherein a distance between two adjacent ones of the four auxiliary light beads is 3 mm to 10 mm.

6. The image display device with an ambient light strip assembly of claim 1, wherein the more than two auxiliary light beads are arranged along a straight line, wherein an included angle between the straight line and the first edge is 15° to 45°.

7. The image display device with an ambient light strip assembly of claim 1, wherein the first edge is perpendicular to the second edge.

8. The image display device with an ambient light strip assembly of claim 1, wherein the first corner light group further comprises a lens housing provided with lenses corresponding to the more than two auxiliary light beads.

9. The image display device with an ambient light strip assembly of claim 8, wherein the first corner light group further comprises a substrate electrically connected to the more than two auxiliary light beads, the lens housing is provided with a lens housing pin inserted into the substrate, and a length of the lens housing pin is greater than or equal to a thickness of the substrate.

10. A light strip assembly, comprising a mounting plate, a first light group, a second light group, a first corner light group, and a second corner light group, wherein the mounting plate is provided with a first edge and a second edge intersecting with each other;

along a direction perpendicular to a plate surface of the mounting plate, a projection of the first light group is adjacent to and arranged along the first edge, and a projection of the second light group is adjacent to and arranged along the second edge;

the first corner light group and the second corner light group are located between the first light group and the second light group and are symmetrical about a straight line passing through a point of intersection of the first edge and the second edge; and the first corner light group comprises more than two auxiliary light beads, an auxiliary light bead of the more than two auxiliary light beads is adjacent to the second corner light group, remaining auxiliary light beads of the more than two auxiliary light beads are arranged in sequence toward the first edge, a vertical distance between the auxiliary light bead adjacent to the second corner light group and the first edge is greater than a vertical distance between an auxiliary light bead of the more than two auxiliary light beads facing away from the second corner light group and the first edge, and an angle of inclination of light emitted by the auxiliary light bead adjacent to the second corner light group relative to the plate surface of the mounting plate is greater than an angle of inclination of light emitted by the auxiliary light bead facing away from the second corner light group relative to the plate surface of the mounting plate.

\* \* \* \* \*